2,967,760
PROCESS OF PREPARING DIBORANE

Stanley J. Chiras, Niagara Falls, N.Y., assignor, by mesne assignments, to Olin Mathieson Chemical Corporation, a corporation of Virginia No Drawing. Filed Apr. 6, 1955, Ser. No. 499,756

5 Claims. (Cl. 23—204)

My invention relates to a method for the production of diborane.

Prior to my present invention, it has been proposed to prepare diborane by reacting certain halides with certain borohydrides, such as sodium borohydride. It has been proposed that the reaction be carried out with the borohydride in admixture with diethyl ether.

In accordance with my present invention, I have discovered that solvents of the type R—$(OC_nH_{2n})_x$—OR' wherein R and R' are alkyl radicals having from 1 to 2 carbon atoms, $n$ is an integer from 2 to 3 and $x$ is an integer from 2 to 4, for example, the dimethyl ether of diethylene glycol, are particularly valuable for use in place of diethyl ether as a solvent when carrying out reactions of the aforementioned type to produce diborane. Thus, I have discovered that when a solvent falling within the scope of the aforementioned generic formula, or a mixture of such solvents, is used, there is provided an advanatgeous process from the standpoints of solvent consumption, yield of desired product and reduced fire and explosion hazard.

Hence my invention is a process for producing diborane by reacting a fluoride or chloride or boron, bismuth or tin, or a mixture of such compounds, and an alkali or alkaline earth metal borohydride, or a mixture of such borohydrides, while the borohydride is in admixture with a solvent falling within the scope of the class R—$(OC_nH_{2n})_x$—OR' or a mixture of such solvents, wehrein R, R' $n$ and $x$ have the significance already given above.

My invention is illustrated by the following examples which set forth various embodiments fal.ing within the scope of my invention and are to be considered not limitative.

EXAMPLE I

The reactor consisted of a 500 ml., three-necked flask fitted with a separatory funnel, a nitrogen inlet tube, a stirrer, a thermowell and a cold-finger condenser which was maintained at −80° C. The reactor was connected to a series of three traps, the first of which was maintained at −80° C. and the other two of which were maintained at −196° C. The synthesis apparatus was connected to a high-vacuum line in which the volume of the product, diborane, could be determined.

A mixture consisting of 336.0 millimoles of sod'um borohydride and 120.5 millimoles of bismuth trichloride was placed in the apparatus. Dry nitrogen was passed through the apparatus for about fifteen minutes. The mixture was stirred and 55 ml. of the dimethyl ether of diethylene glycol was added over a period of 0.17 hour. The addition was highly exothermic. The reaction mixture was heated to about 60–75° C. and stirred for an additional 3.6 hours during which time 64.6 millimoles of diborane (vapor pressure 228 mm. of mercury at −111.8° C.) was isolated. This represented a 38 percent uncorrected yield of diborane, based on sodium borohydride.

EXAMPLE II

Using apparatus of the type described in Example I, a slurry consisting of 98.1 millimoles of sodium borohydride and 230.0 millimoles of dimethyl ether of triethylene glycol was placed in the diborane synthesis apparatus. The reactor was then purged with oxygen-free dry nitrogen for about fifteen minutes. The reaction mixture was stirred and 33.2 millimoles of stannic chloride was added dropwise. The reaction mixture then was stirred and heated at 65–78° C. for four hours, during which time 20.3 millimoles of diborane (vapor pressure of 219 mm. of mercury at −113° C.) was obtained, representing a 65 percent yield based on the sodium borohydride.

EXAMPLE III

Using apparatus of the type described in Example I a solution composed of 98.5 millimoles of sodium borohydride dissolved in 192 millimoles of the dimethyl ether of triethylene glycol was added to 1100 millimoles of boron trifluoride-diethyl etherate over a period of 0.33 hour. The reaction mixture then was stirred for an additional 0.42 hour. The crude gaseous product was fractionated through a trap which was maintained at −140° C. Diborane in the amount of 39.5 millimoles having a vapor pressure of 227 mm. of mercury at −111.8° C. was formed, representing a 27 percent uncorrected yield based on sodium borohydride.

EXAMPLE IV

In this experiment a solution composed of 41.8 millimoles of sodium borohydride dissolved in 906 millimoles of the dimethyl ether of triethylene glycol was placed in a diborane generator. 111.5 millimoles of gaseous boron trichloride, metered through a rotometer, was passed beneath the surface of the solution. After 0.04 hour, the reaction mixture was heated to about 45° C. The reaction was conducted under an atmosphere of dry nitrogen. After the addition of the boron trichloride had been completed, this step requiring 0.95 hour, the reaction mixture was stirred for an additional 1.63 hours. The crude gaseous product was fractionated through a trap which was maintained at −140° C. and transferred to a calibrated system for a volume measurement. 13.25 millimoles of diborane having a vapor pressure of 226.5 millimeters of mercury at −112° C. was prepared, representing a 48 percent uncorrected yield of diborane based on sodium borohydride.

Table I below sets forth pertinent data with respect to three other experiments which were carried out in the manner of Example IV.

Table I

| Experiment | A | B | C |
| --- | --- | --- | --- |
| Principal Variables: | | | |
| Reaction time, hrs | 1.75 | 2.25 | 1.75 |
| Reaction temp., °C | 44–55 | 22–58 | 22–50 |
| Time addition $BCl_3$, hrs | 0.25 | 1.50 | 1.50 |
| Materials in Millimoles: | | | |
| $NaBH_4$ | 41.9 | 41.8 | 42.0 |
| $BCl_3$ | 31.5 | 428.0 | 252.0 |
| $CH_3(OC_2H_4)_3OCH_3$ | 817.0 | 1,250.0 | 888.0 |
| Materials Out, Millimoles: | | | |
| $B_2H_6$ | 11.75 | 2.80 | 4.21 |
| Percent uncorrected $B_2H_6$ | 42 | 10 | 15 |
| Yield based on $NaBH_4$ | | | |

EXAMPLE V

In this experiment 73.8 millimoles of sodium borohydride was dissolved in 1135 millimoles of the diethyl ether of triethylene glycol contained in a 500 ml. three-necked flask fitted with a cold-finger condenser (−80° C.) and a glass delivery tube. The reactor was attached to a product collection manifold consisting of three traps connected in series. The first was cooled to −80° C. and the other two were cooled to −196° C. Dry nitrogen was passed through the system for about fifteen minutes, and the reaction mixture was stirred magnetically. The solution of sodium borohydride was heated to 50° C. and then boron trichloride (125 millimoles) was added over a period of 2.5 hours. Diborane in the amount of 24.5 millimoles was evolved, representing a 50 percent uncorrected yield based on the sodium borohydride.

EXAMPLE VI

In this experiment, the procedure of Example V was substantially repeated. However, the reaction time was 1.16 hours, that being the time required for the boron trichloride addition. The amounts of sodium borohydride and boron trichloride used were 73.7 and 57 millimoles, respectively. 22.9 moles of diborane was collected, representing a 47 percent uncorrected yield, based upon sodium borohydride.

EXAMPLE VII

In this experiment, 14.3 millimoles of diborane was prepared by passing an excess of boron trifluoride through a solution of 73.8 millimoles of sodium borohydride in 830 millimoles of the dimethyl ether of triethylene glycol. The reaction temperature was 34–60° C., the reaction time was 0.68 hour and the boron trifluoride was added for a period of 0.573 hour. The diborane produced represented a 30 percent uncorrected yield, based upon sodium borohydride.

Various modifications can be made in the procedures of the specific examples to provide other embodiments which fall within the scope of my invention. Thus, in place of the sodium borohydride employed in the specific examples there can be substituted an equivalent amount of other alkali metal or alkaline earth metal boron hydrides such as lithium borohydride, potassium borohydride, calcium borohydride and so forth. The relative amounts of halide and borohydride used as reactants is not critical and can be varied considerably with some effect upon the yield. Likewise, the reaction temperature utilized can be varied considerably, as the specific examples illustrate, but is generally within the range from about 20° C. to about 120° C.

In place of the dimethyl ether of diethylene glycol or the dimethyl ether of triethylene glycol employed in the specific examples, there can be substituted other solvents which fall within the class R—$(OC_nH_{2n})_x$—OR' wherein R and R' are alkyl radicals having from 1 to 2 carbon atoms, $n$ is an integer from 2 to 3 and $x$ is an integer from 2 to 4, for example, the diethyl ether of diethylene glycol, the diethyl ether of triethylene glycol, the dimethyl ether of dipropylene glycol, the diethyl ether of tripropylene glycol and the like. The amount of solvent employed can be varied with some effect upon the result, but in general I prefer that the amount of solvent used be from about 5 to about 15 times the weight of the borohydride.

I claim:

1. A method for the preparation of diborane which comprises reacting at least one halide selected from the group consisting of bismuth trichloride and bismuth trifluoride and an alkali metal borohydride while the borohydride is in admixture with at least one solvent of the class R—$(OC_nH_{2n})_x$—OR' wherein R and R' are alkyl radicals having from 1 to 2 carbon atoms, wherein $n$ is an integer from 2 to 3 and wherein $x$ is an integer from 2 to 4 and recovering diborane from the reaction mixture.

2. A method according to claim 1 in which the borohydride is sodium borohydride.

3. A method according to claim 1 in which the solvent is the dimethyl ether of diethylene glycol.

4. A method according to claim 1 in which said halide is bismuth trichloride.

5. A method according to claim 1 in which said borohydride is sodium borohydride, in which said solvent is the dimethyl ether of diethylene glycol and in which said halide is bismuth trichloride.

References Cited in the file of this patent
UNITED STATES PATENTS

| | | |
|---|---|---|
| 2,543,511 | Schlesinger et al. | Feb. 27, 1951 |
| 2,544,472 | Schlesinger et al. | Mar. 6, 1951 |
| 2,545,633 | Schlesinger | Mar. 20, 1951 |
| 2,575,760 | Hoekatra | Nov. 20, 1951 |
| 2,717,696 | Schubert | Sept. 13, 1955 |
| 2,888,326 | Schechter et al. | May 26, 1959 |

OTHER REFERENCES

Schechter et al.: "Boron Hydrides and Related Compounds," January 8, 1951, declassified January 5, 1954, Bureau of Aeronautics, Dept. of Navy, page 52.

Schechter et al.: "Boron Hydrides and Related Compounds," January 8, 1951, declassified January 5, 1954, Bureau of Aeronautics, Dept. of Navy, page 44.

Bell: "Quarterly Reviews" (London), vol. 2, page 138 (1948).

Schaeffer et al.: "J.A.C.S.," vol. 71, pages 2143–5 (1949).

Hoekstra et al.: "J.A.C.S.," vol. 71, page 2490 (1949).

Bulletin 502A on "Sodium Borohydride," publ. by Metal Hydrides, Inc., 12–24 Congress St., Beverly, Mass., and consisting of 2 pages. Rec'd in U.S. Patent Office, Div. 59, February 15, 1950.